United States Patent
Shkolnikov

(10) Patent No.: US 7,966,146 B2
(45) Date of Patent: Jun. 21, 2011

(54) FORCE SENSING APPARATUS AND METHOD TO DETERMINE THE RADIUS OF ROTATION OF A MOVING OBJECT

(75) Inventor: Mark Shkolnikov, Herndon, VA (US)

(73) Assignee: Keynetik, Inc., Herndon, VA (US)

( * ) Notice: Subject to any disclaimer, the term of this patent is extended or adjusted under 35 U.S.C. 154(b) by 460 days.

(21) Appl. No.: 12/101,578

(22) Filed: Apr. 11, 2008

(65) Prior Publication Data

US 2008/0255795 A1  Oct. 16, 2008

Related U.S. Application Data

(60) Provisional application No. 60/911,745, filed on Apr. 13, 2007, provisional application No. 61/027,118, filed on Feb. 8, 2008.

(51) Int. Cl.
*G01P 15/00* (2006.01)
*G01C 21/00* (2006.01)

(52) U.S. Cl. ............... 702/141; 73/514.35; 340/573.1; 340/679; 701/207

(58) Field of Classification Search ........... 702/41, 702/141, 151, 153; 73/504.14, 514.35; 701/38, 701/207; 340/427, 571, 573.1, 679; 345/156, 345/157, 169; 280/5.508; 348/208.2; 600/534, 600/595
See application file for complete search history.

(56) References Cited

U.S. PATENT DOCUMENTS

| | | | |
|---|---|---|---|
| 5,408,879 A * | 4/1995 | Vreeburg et al. | ....... 73/514.35 |
| 5,835,077 A | 11/1998 | Dao et al. | |
| 6,060,336 A | 5/2000 | Wan | |
| 6,332,104 B1 | 12/2001 | Brown et al. | |
| 6,377,888 B1 * | 4/2002 | Olch | ............... 701/207 |
| 6,419,240 B1 | 7/2002 | Burdock et al. | |
| 6,466,198 B1 | 10/2002 | Feinstein | |
| 6,567,068 B2 | 5/2003 | Rekinaoto | |
| 6,573,883 B1 | 6/2003 | Bartlett | |
| 6,588,769 B2 | 7/2003 | Burdock | |
| 6,640,609 B1 | 11/2003 | Nadkarni et al. | |
| 6,642,067 B2 | 11/2003 | Dwyer | |
| 6,690,358 B2 | 2/2004 | Kaplan | |
| 6,718,244 B2 | 4/2004 | Lin et al. | |
| 6,752,401 B2 | 6/2004 | Burdock | |
| 6,829,524 B2 | 12/2004 | Chee | |
| 6,847,351 B2 | 1/2005 | Noguera | |
| 6,847,875 B2 | 1/2005 | Lu et al. | |

(Continued)

FOREIGN PATENT DOCUMENTS

EP    1271288    1/2003

(Continued)

OTHER PUBLICATIONS

Gaetano Canepa et al. "Kinematic Calibration by Means of a Triaxial Accelerometer" IEEE 1994, pp. 2776-2782, Sep. 14, 2010.

*Primary Examiner* — John H Le
(74) *Attorney, Agent, or Firm* — Lieberman & Brandsdorfer, LLC

(57) ABSTRACT

An apparatus having an arrangement of two or more identical accelerometers with aligned sensitivity axes. Each of the accelerometers senses motion over at least one axis. The accelerometer readings include a component corresponding to gravitational force that is the same for each accelerometer in the arrangement. Logic circuitry in communication with the accelerometer arrangement couples accelerometer signals to a processor to compute motion variables.

27 Claims, 12 Drawing Sheets

U.S. PATENT DOCUMENTS

| | | |
|---|---|---|
| 6,892,575 B2 | 5/2005 | Nasiri et al. |
| 6,977,675 B2 | 12/2005 | Kotzin |
| 6,983,219 B2 | 1/2006 | Mantyjarvi et al. |
| 6,992,585 B2 | 1/2006 | Saleh et al. |
| 7,023,330 B2 | 4/2006 | Kamen et al. |
| 7,038,662 B2 | 5/2006 | Noguera |
| 7,059,182 B1 | 6/2006 | Ragner |
| 7,084,762 B2 | 8/2006 | Pedrazzini et al. |
| 7,136,731 B2 | 11/2006 | Lu et al. |
| 7,138,979 B2 | 11/2006 | Robin et al. |
| 7,140,250 B2 | 11/2006 | Leonardson et al. |
| 7,170,374 B2 | 1/2007 | Lee et al. |
| 7,180,500 B2 | 2/2007 | Marvitt et al. |
| 7,180,501 B2 | 2/2007 | Marvitt et al. |
| 7,180,502 B2 | 2/2007 | Marvitt et al. |
| 7,184,025 B2 | 2/2007 | Williams et al. |
| 7,194,816 B2 | 3/2007 | Tamura |
| 7,206,679 B2 | 4/2007 | Schubert et al. |
| 7,602,301 B1 * | 10/2009 | Stirling et al. ............. 340/573.1 |
| 2002/0190947 A1 | 12/2002 | Feinstein |
| 2003/0001863 A1 | 1/2003 | Davidson et al. |
| 2003/0058118 A1 * | 3/2003 | Wilson ........................ 340/679 |
| 2005/0030286 A1 | 2/2005 | Ishida |
| 2005/0246109 A1 | 11/2005 | Bang et al. |
| 2006/0044268 A1 | 3/2006 | Robin et al. |
| 2006/0150731 A1 | 7/2006 | Fontanella et al. |
| 2006/0163825 A1 | 7/2006 | Hamm |
| 2007/0146323 A1 | 6/2007 | Nishikata et al. |

FOREIGN PATENT DOCUMENTS

| | | |
|---|---|---|
| WO | 9811528 | 3/1998 |
| WO | 0186920 | 11/2001 |
| WO | 03077087 | 9/2003 |
| WO | 2005109215 | 11/2005 |

* cited by examiner

FORCE SENSING APPARATUS AND METHOD TO DETERMINE THE RADIUS OF ROTATION OF A MOVING OBJECT

CROSS REFERENCE TO RELATED APPLICATION(S)

This is a non-provisional utility patent application claiming benefit of the filing dates of U.S. provisional patent application Ser. No. 60/911,745, filed Apr. 13, 2007, and titled "A Force Sensing Apparatus and Method to Determine the Radius of Rotation of a Moving Object", and U.S. provisional patent application Ser. No. 61/027,118, filed Feb. 8, 2008, and titled "A Force Sensing Apparatus and Method to Determine the Radius of Rotation of a Moving Object", both of which are hereby incorporated by reference.

FIELD OF THE INVENTION

The invention discloses an apparatus that detects rotational and translational movement of a device that corresponds to motion input. An arrangement of two or more accelerometers is integrated into the device, wherein the accelerometers are separated in space and have aligned sensitivity axes. Logic circuitry in communication with the arrangement of the accelerometers couples accelerometer signals to a processor to compute motion variables.

DESCRIPTION OF THE PRIOR ART

There are several different types of sensors that can be employed to sense the motion of a moving object. The motion can be detected in relevance to an external or internal reference point. This invention utilizes accelerometers, a motion sensor which relies on inertia of a suspended proof mass as a reference. Another inertial motion sensor is a gyroscope. A gyroscope is a device for measuring or maintaining orientation based on the principle of conservation of angular momentum. The gyroscope is sensitive to rotational movement and at the same time is tolerant to interference. In contrast to the accelerometer, the gyroscope is larger, more expensive, and requires more power to operate. An accelerometer is a device for measuring linear acceleration, detecting and measuring vibrations, or orientation relative to the vector of gravity. Accelerometers are affected by gravity and interference. Physically, an accelerometer is small, inexpensive, and consumes little power in comparison to a gyroscope.

It is known in the art to configure a motion sensor to sense a change in orthogonal components of acceleration, velocity, displacement, and/or electromagnetic field of a moving object to which the sensors are attached. A processor in communication with the accelerometers may be programmed to calculate characteristics of system motion based upon data conveyed by the sensors. One common approach to derive angular and linear velocity, and position of a rotating rigid object using linear accelerometers is through mathematical integration calculations. First, the angular acceleration is derived by solving a linear system of differential equations which are using input from multiple accelerometers, and its integration provides the angular velocity, and a second integration provides the position of the object relative to an external reference frame. Systems utilizing this approach suffer from several drawbacks, including complex mathematical calculations, which require a heavy software footprint and high processing power. The complex calculations also introduce significant latency to motion signal processing often unacceptable in real-time applications.

It is known in the art to employ one or more motion sensors in handheld computing devices. Examples of such handheld computing devices that employ some form of motion sensor(s) include U.S. Pat. Nos. 7,180,500; 7,180,501, and 7,180,502. Each of the above-noted patents employs motion sensors that include three single axis accelerometers. In other words, one accelerometer senses motion in the x direction, a second accelerometer senses motion in the y direction, and a third accelerometer senses motion in the z direction. When combined, the data from the three accelerometers is able to detect device translation and rotation that serves as motion input.

Most devices that employ accelerometers as motion detectors are sensitive to the gravitational force. For example, U.S. Patent Publication No. 2002/0093483 to Kaplan and U.S. Patent Publication No. 2004/023626 to Noguera, employ accelerometers that provide a signal corresponding to gravitational force. By providing a gravitational force signal, a current orientation of the device has to be continuously tracked. In many devices, gravitational force can play a role of an undesired interference factor. More specifically, the contribution of gravitational force to accelerometer readings is defined by device spatial position. An accelerometer simultaneously measures the force applied by a user and the gravitational force. To "interpret" a user's motion input as a pattern, one needs to filter out the interference of the gravitational force. Tracking the device orientation continuously in combination with complex calculations in time, the gravitational force contribution to accelerometer readings can be estimated. However, these calculations are complex and tend to accumulate calculation inaccuracies over time. To make thing worse in many cases the desired motion input is being obscured by interference. The problem of separation of an intentional user input from accidental user motion and external forces interferences is a big challenge with handheld devices. An active keyboard with two sets of motion sensors is disclosed in the U.S. Pat. No. 7,002,553 to Shkolnikov. In the '553 patent, signals are received from identical, properly aligned, and separated motion sensors. The signals are processed by motion filter software to negate influence of external forces, such as external forces related to movement of the vehicle where the handheld device is placed. Step motion software instructions are used in earlier handheld device with a single motion sensor of Shkolnikov '028 with motion input to continuously track the device orientation and to account for gravitational force. Accordingly, there are shortcomings in the prior art with respect to gravitational force.

Therefore, there is a need for a motion sensor system and method of calculation of the radius of device rotation and other motion variables that does not require tracking of the device orientation to filter out the gravity and other motion interference and calculate the reference tilt. It is further desired that the solution would minimize the numerical calculations, thus reducing required processing power.

SUMMARY OF THE INVENTION

In one aspect of the invention, an apparatus is provided with a body having at least two accelerometers mounted in the body. The accelerometers are separated within the body in space, and function to sense movement on at least one sensitivity axis. The apparatus also includes a processor in communication with the accelerometers. The processor is configured to receive sensed motion data received from the accelerometer readings and to compute motion of the body from the motion data. The processor executes instructions to compute a radius of rotation and direction to an axis of rotation of the body based upon the accelerometer data. The instructions apply geometrical principals to real-time accelerometer readings and fixed orientation and position of the accelerometers in referenced to the body.

In another aspect of the invention, an article is provided with a body having at least one mounted accelerometer configured to sense movement on at least one sensitivity axis. A computer readable carrier is provided with a motion input algorithm to translated sensed movement received from the accelerometer into a command. In addition, the computer readable carrier includes a step motion input algorithm configured to process the command. The step motion algorithm includes instructions to execute a command from the motion input algorithm, instructions to send a sleep command to the motion input algorithm after the command is executed, and instructions to re-activate the motion sensing algorithm from the sleep command after elapse of a defined period of time.

In yet another aspect of the invention, a method is provided to sense movement of a body. At least two accelerometers are mounted in a body. The accelerometers configured to sense movement on at least one sensitivity axis. A processor in communication with the accelerometers receives sensed motion data from accelerometer data. The processor computes motion of the body from the motion data. The processor executes instructions for computing a radius of rotation and direction to an axis of rotation of the body, and applies geometrical principals to real-time accelerometer readings and fixed orientation and position of the accelerometers.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The present motion sensor system addresses the problem of gravity and motion interference by using a novel arrangement of two or more identical accelerometers with aligned sensitivity axes. Each of the accelerometers senses motion over at least two axes. The accelerometer readings include a component corresponding to gravitational force that is the same for each accelerometer in the arrangement. Taking the difference in accelerometer readings one can eliminate or reduce the gravitational interference and interference produced by external forces that are the same for each accelerometer in the system. Logic circuitry in communication with the accelerometer arrangement couples accelerometer signals to a processor to compute motion variables.

Technical Details

The varying arrangement of inertial motion sensors, i.e. accelerometers, and the data produced thereby are shown in details in the figures described below. In each of the figures below with their associated descriptions, there are three terms that are used there through, and they include centripetal acceleration, tangential acceleration, and angular acceleration. Centripetal acceleration is defined as the rate of change of centripetal velocity. Tangential acceleration is defined as directed tangentially to the path of motion. Since velocity is also tangential to the path of motion, tangential motion is directed in the direction of velocity. The component of acceleration in the tangential direction represents the change in the magnitude of velocity. Angular acceleration is defined as the rate of change of angular velocity over time. It is commonly measured in radians per second squared and here after is denoted by the Greek letter omega, $\Omega$.

Figure 1:
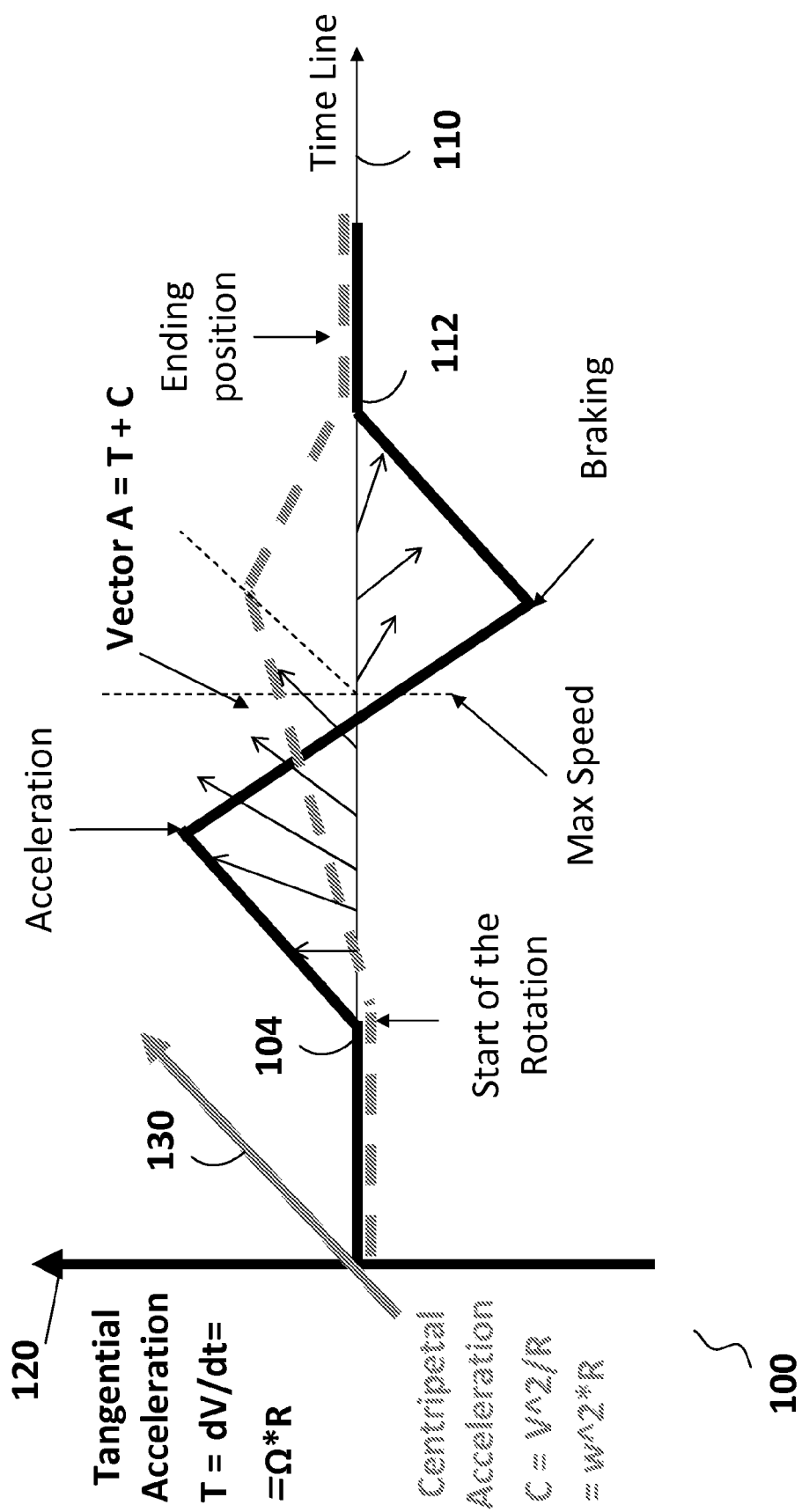
FIG. 1 is a diagram showing tangential and centripetal forces over a timeline.

In one embodiment, the calculation of tangential and centripetal accelerations is measured with respect to time. A non-uniform circular motion (accelerated rotation) produces forces which are sensed by accelerometers as tangential and centripetal accelerations. More specifically, the total acceleration, A, is the sum of the tangential acceleration and the centripetal acceleration. Taking readings of two or three accelerometers and calculating them over time, the tangential and centripetal forces can be separated. Adding calculation in time can further enhance capabilities of the accelerometer arrangements. FIG. 1 is a diagram (100) demonstrating change of accelerations over time, starting from the initial position (104), and ending position (112). The horizontal axis (110) corresponds to time, the vertical axis (120) corresponds to tangential acceleration, and the orthogonal axis (130) corresponds to centripetal acceleration. Tangential acceleration, referred to herein as T, and centripetal acceleration, referred to herein as C, are orthogonal in space and asynchronous in time. For example, during rotation, the acceleration vector, A, will change from being substantially tangential to centripetal and return to tangential. Projections of tangential and centripetal acceleration on the horizontal, vertical, and orthogonal axes depend on the orientation of the accelerometer towards the axis of rotation.

Both tangential and centripetal accelerations are proportional to the radius of rotation. Distribution of accelerations inside of a rigid object is linear. The full vector notation for acceleration, including the gravitational field is as follows:

$$A = G + T + C,$$

where G is the force of gravity, T is tangential acceleration, and C and T are both components of A expressed as follows:

$$C = w^2 R = |A| \cos \delta$$

$$T = \Omega R = |A| \sin \delta,$$

where w is the measure of angular velocity. Another form of expression the full vector notation for acceleration is as follows:

$$A = G + (\Omega \times R) + w \times (w \times R)$$

$$A = G + M \times R,$$

where M is an angular rotation vector with both tangential and radial components and x is a notation for a vector cross product. More specifically, M is expressed as follows:

$$M = (\Omega + w\hat{\,}2),$$

where omega is the angular acceleration. Since omega and w are angular values, they each need to be multiplied by R to get the linear values. The linear velocity conveys the angular distance with respect to time, and w conveys the degrees rotated. M is the angular rotation vector with tangential and radial components. In a geometric notation M×R is equivalent to i |M| |R| sin δ, where delta is changing in time but is invariant from the location in the object for every distance of time.

As demonstrated above and is known in the art, the vector acceleration field inside of a rotating object is linear. Therefore, it is possible to calculate the acceleration vector in any part of the object if we know the vector values in points which are not aligned with either radial lines or trajectory of rotation. When gravity is not affecting the accelerometers, it would be sufficient to have two points in the body where the radial and tangential gradients are different. Similarly, when the gravity is affecting the accelerometers, it will be required to know acceleration vector in three or four points of the body.

Figure 2:
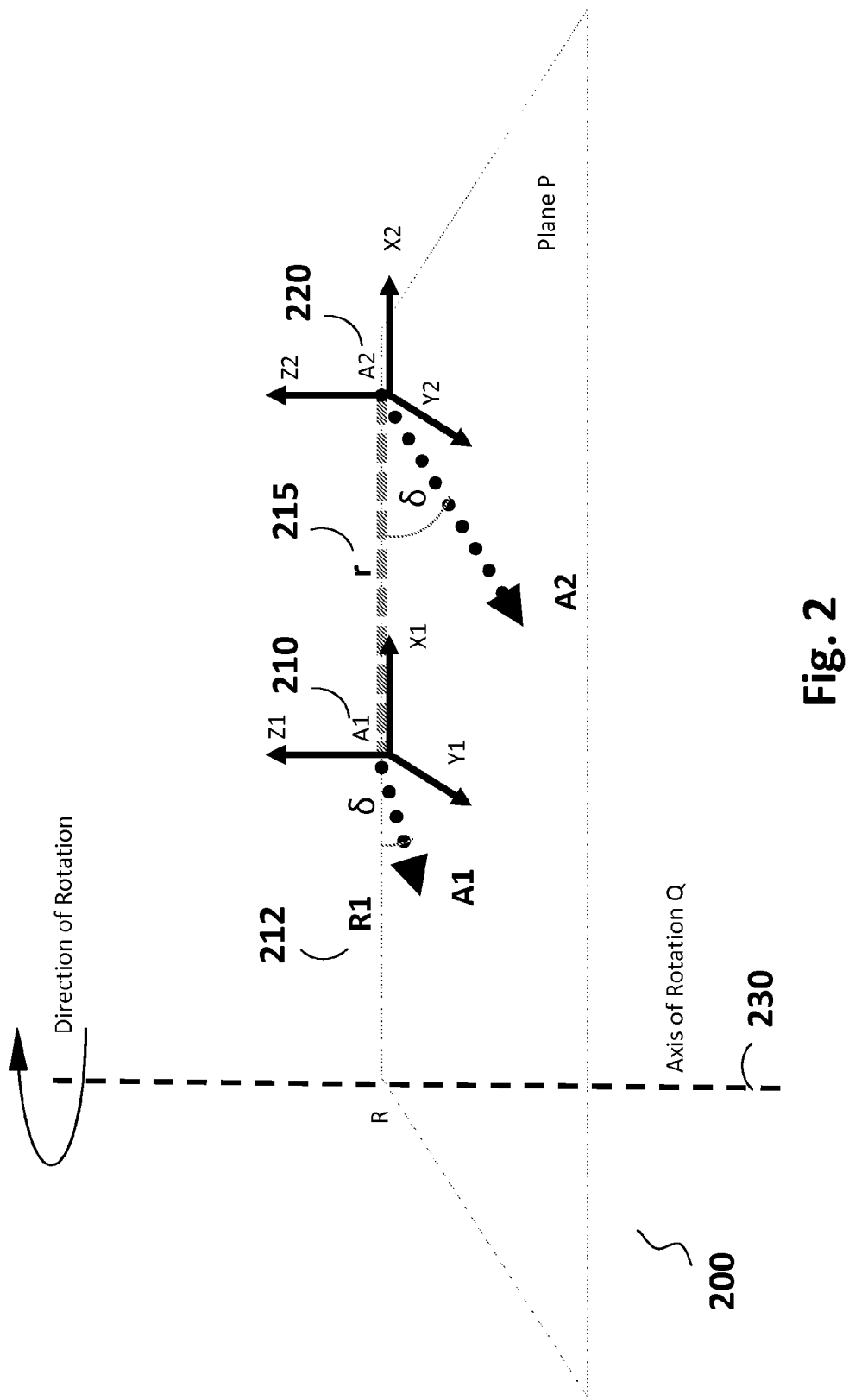
FIG. 2 is a diagram showing two single axis accelerometers placed on an axis of rotation.

FIG. 2 is a diagram (200) of an arrangement of two tri axis accelerometers $A_1$ (210) and $A_2$ (220) placed on an axis of rotation (230). There is a fixed distance $R_1$ (212) between the first accelerometer $A_1$ (210) and the instant axis of rotation (230). Similarly, there is a fixed distance ($R_1$+r) between the second accelerometer $A_2$ (220) and the axis of rotation, wherein r (215) is the fixed distance between the two accelerometers (210) and (230). Expressed in another form, the distance between the first accelerometer A1 (210) and the second accelerometer $A_2$ (220) is defined as r. The mathematical relationship between the acceleration vectors of the two accelerometers and their respective distance to the axis of rotation (230) is defined as follows:

$$A_2/(R_1+r) = A_1/R_1$$

$R_1$ can then be expressed based upon the readings of the first and second accelerometers (210) and (220), respectively, as follows:

$$R_1 = (A_1 r)/(A_2 - A_1)$$

and can further be expressed based upon either X or Y, or combined X and Y components of A of the first and second accelerometers (210) and (220), respectively, as follows:

$$R_1 = (Y_1 r)/(Y_2 - Y_1)$$

Accordingly, as shown herein when the accelerometers are linearly arranged, the radius of rotation can be determined with two single axis accelerometers.

Figure 3:
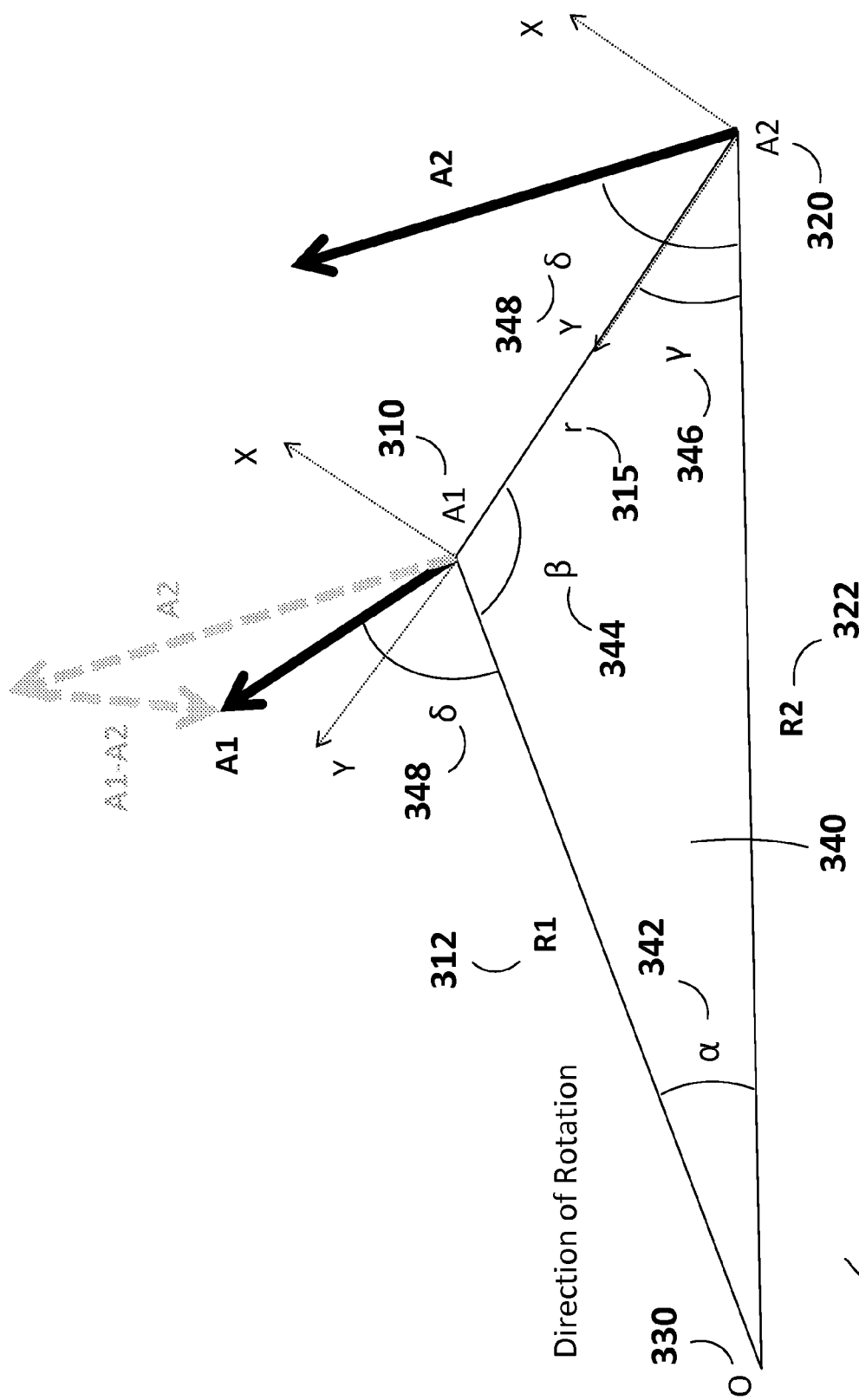
FIG. 3 is a block diagram showing two dual axis accelerometers rotating in a plane orthogonal to the axis of rotation.

FIG. 3 is a block diagram (300) of two dual axis accelerometers rotating in a plane orthogonal to the axis of rotation. More specifically, as shown, there is a first accelerometer (310) and a second accelerometer (320) embedded into an object (not shown). The distance between the first and second accelerometers (310) and (320), respectively, is fixed and defined as r (315). Both of the accelerometers rotate about a point of rotation defined as (330). Furthermore, the vector radius of rotation for the first accelerometer (310) is defined as $R_1$ (312), and the vector radius of rotation for the second accelerometer (320) is defined as $R_2$ (322). The vector of acceleration of the first accelerometer (310) is defined as $A_1$, and the vector acceleration of the second accelerometer (320) is defined as $A_2$. The vector radius of rotation $R_1$, $R_2$, and the fixed distance between the accelerometers r, form a virtual triangle (340). The angles formed by the virtual triangle (340) are defined as α (342), β (344), and γ (346). Similarly, δ (348) is defined as the angle between the either angular rotation vector $A_1$ or $A_2$, the corresponding radius of rotation.

As shown, two identically oriented dual axis accelerometers (310) and (320) separated by a fixed distance are rotating over a point in planar space. The known parameters of the configuration are accelerometer readings and the fixed distance r. If it is assumed that the plane of rotation is orthogonal to gravity, and the accelerometer reading is not affected by gravity, the accelerometer reading may be defined as follows:

$$A_1 = M R_1$$

$$A_2 = M R_2$$

The angle delta between the vector acceleration A and the corresponding radius R is constant in every point in the rotating object.

Based upon the principle of geometry, the following is the relationship between the radiuses and the angles:

$$r/\sin \alpha = |R_1|/\sin \gamma = |R_2|/\sin \beta$$

The variable r is defined as a fixed value. Therefore, vectors $R_1$ and $R_2$ may be calculated as follows:

$$|R_1| = r \sin \gamma / \sin \alpha$$

$$|R_2| = r \sin \beta / \sin \alpha$$

Since the triangle comprised by the vectors $A_1$, $A_2$, and their difference ($A_1 - A_2$) is similar to the triangle comprised by $R_1$, $R_2$ and r, sins of the angle can be found using a vector cross product formula, as follows:

$$\sin \alpha = |A_1 \times A_2|/(|A_1||A_2|)$$

$$\sin \beta = |A_1 \times (A_1 - A_2)|/(|A_1||A_1 A_2|)$$

$$\sin \gamma = |A_2 \times (A_1 - A_2)|/(|A_2||A_1 - A_2|)$$

Based upon the definitions for the vectors of $R_1$ and $R_2$ provided above, each of these vectors may be expressed as reading of the accelerometers as follows:

$$|R_1| = r(|A_2 \times (A_1 - A_2)| |A_1|/(|A_1 - A_2| |A_1 \times A_2|)$$

$$|R_2| = r (|A_1 \times (A_1 - A_2)| |A_2|/(|A_1 - A_2| |A_1 \times A_2|)$$

which can be further reduced to $$|R_1| = r|A_1|/|A_1 - A_2| \text{ and}$$

$$|R_2| = r|A_2|/|A_1 - A_2|$$

Once vectors $R_1$ and $R_2$ are known, angular rotation parameters of the motion can be found as follows:

$$M = A_1/R_1 = A_2/R_2$$

$$\cos \delta = (A_1 . R_1)/(|A_1| |R_1|)$$

$$w = \text{square root of } ((|A_1| \cos \delta)/R_1) = \text{square root of } ((|A_2| \cos \delta)/R_2)$$

$$\Omega = |A_2| \sin \delta / R_2$$

Accordingly, based upon the principles of geometry and linear algebra, all of the angular accelerations, velocities and radius of rotation of each accelerometer can be defined in terms of measurements from the accelerometer readings themselves.

Figure 4:
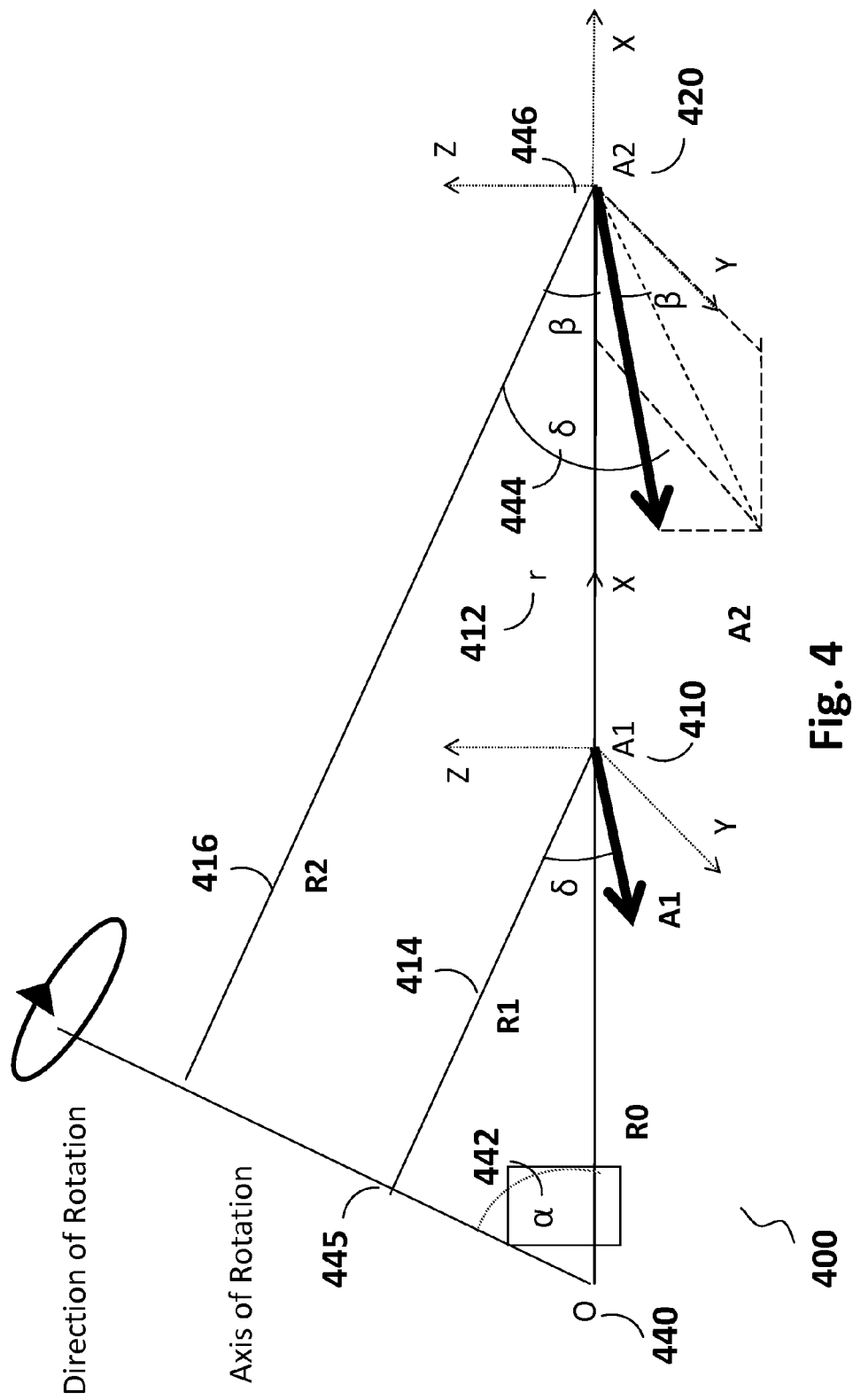
FIG. 4 is a block diagram showing two tri-axis accelerometers rotating over an axis co-planar with the accelerometers.

FIG. 4 is a block diagram (400) of two tri-axis accelerometers rotating over an axis co-planar with the accelerometers. More specifically, as shown, there is a first accelerometer (410) and a second accelerometer (420) embedded into an object (not shown). The distance between the first and second accelerometers (410) and (420), respectively, is fixed and defined as r (412). Both of the accelerometers rotate about an axis of rotation (445) and point (440) located on the intersection of the axis of rotation and line connecting accelerometers. The vector radius of rotation for the first accelerometer (410) is defined as $R_1$ (414), and the vector radius of rotation for the second accelerometer (420) is defined as $R_2$ (416). The vector of acceleration of the first accelerometer (410) is defined as $A_1$, and the vector acceleration of the second accelerometer (420) is defined as $A_2$. The known parameters are the accelerometer readings $A_1$ and $A_2$ and the fixed distance there between r (412). If it is assumed that the accelerometers are not affected by gravity, the following principle holds: $A_N = M \times R_N$. In addition, the following angles are defined:

α (442) is the angle formed by the axis of rotation (445) and the line connecting the accelerometers δ (444) is the instant value of the time variant angle between the angular acceleration vector M and the corresponding radius of rotation R Based upon the principles of geometry, the following is the relationship between accelerometers and their associated radiuses:

$$A_2/A_1 = (|R_o| + r)/|R_o|,$$

and solving for $R_o$ it is expressed as follows:

$$|R_o| = r A_1/(A_2 - A_1)$$

Due to the nature of the rotational motion, $A_N$ and $R_N$ are always in a plane orthogonal to the axis of rotation and the following principles hold:

$$\cos(\beta) = A_{xy}/|A|$$

$$|R_1| = |R_0| \cos(\beta) = |R_0| \sin \alpha$$

$$|R_2| = (|R_0| + r)\cos(\beta) = (|R_0| + r)\sin \alpha$$

Once $R_1$ and $R_2$ are known, the angular rotation parameters of the motion can be found as follows:

$$\cos \delta = |A_2 \cdot R_2|/(|A_2||R_2|)$$

$$w = \text{square root of } ((|A_2|/|R_2|)\cos \delta)$$

$$\Omega = (|A_2|/|R_2|)\sin \delta$$

Accordingly, based upon the principles of geometry and linear algebra, all of the angular accelerations, velocities and distances of each accelerometer can be defined in terms of measurements from the accelerometer readings themselves.

Figure 5:
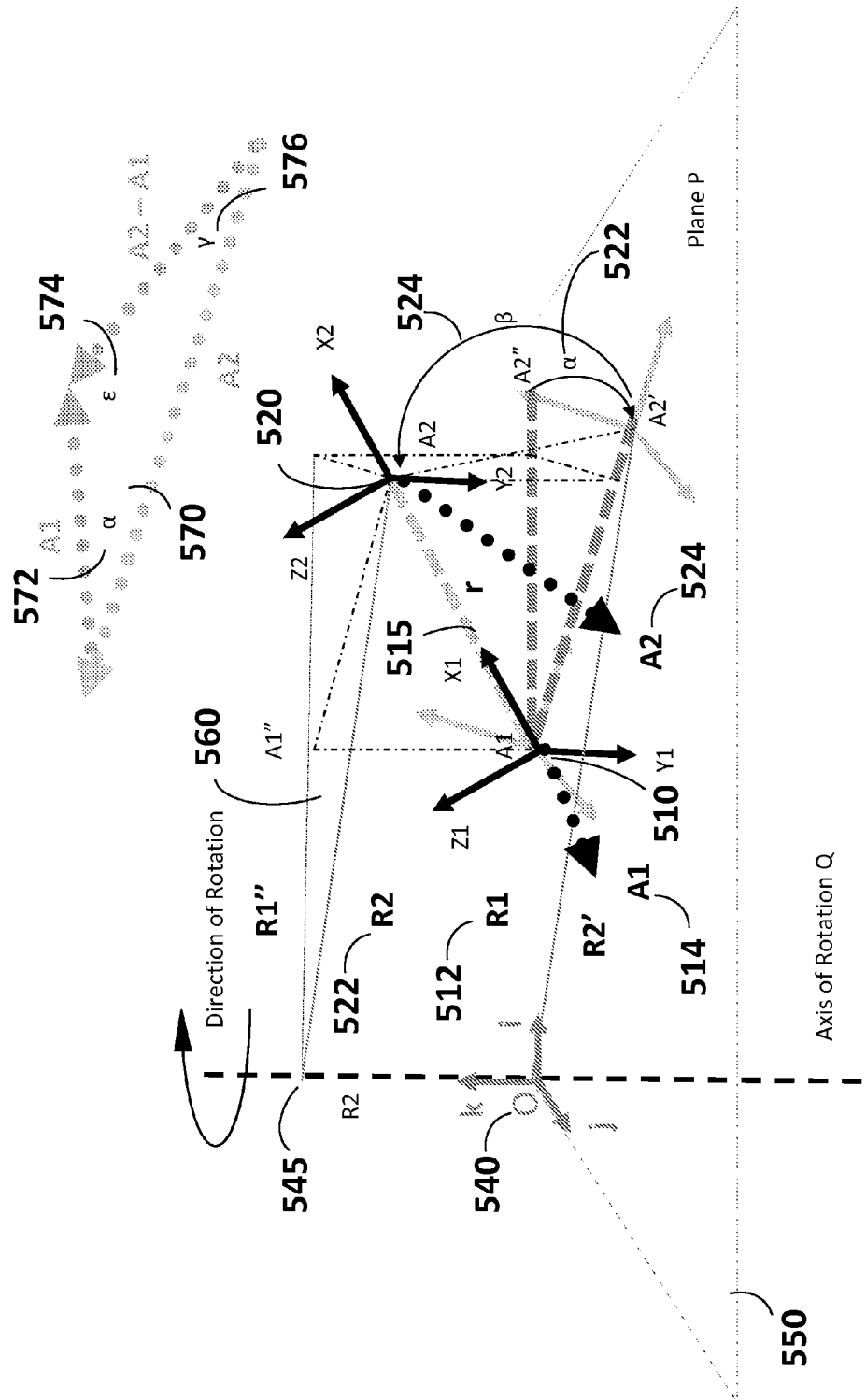
FIG. 5 is a block diagram showing two tri-axis accelerometers rotating around a free standing axis in three dimensions.

FIG. 5 is a block diagram (500) of two tri-axis accelerometers rotating around a free standing axis in three dimensions. More specifically, as shown, there is a first accelerometer (510) and a second accelerometer (520) embedded into an object (not shown). The positions and orientation of the accelerometers (510) and (520) are fixed and known. The distance between the first and second accelerometers (510) and (520), respectively, is fixed and defined as r (515). Both of the accelerometers (510) and (520) rotate about an axis of rotation (545) which intersects with a plane, P (550) at the point (540). The vector radius of rotation for the first accelerometer (510) is defined as $R_1$ (512), and the vector radius of rotation for the second accelerometer (520) is defined as $R_2$ (522). The vector of acceleration of the first accelerometer (510) is defined as $A_1$ (514), and the vector acceleration of the second accelerometer (520) is defined as $A_2$ (524). The known parameters are the accelerometer readings $A_1$ and $A_2$ and the fixed distance there between r (515). The projection of the line connecting the first accelerometer (510) with the second accelerometer (520) makes an angle α (522) with the line which is connecting point (540 and first accelerometer (510). Similarly, the line connecting the second accelerometer (520) with the first accelerometer (510) makes an angle β (524) with the plane (550). Angles α (522) and β (524) show direction and orientation of the accelerometers (510) and (520) relative to the axis of rotation (545). The following defines angle α (522) with respect to reading from the accelerometers:

$$\sin \alpha = ((A_1 \times A_2)/(|A_1| |A_2|))$$

Applying same logic as used for the arrangement of accelerometers depicted in FIG. 4, angle β (524) can also be derived based upon the readings of either accelerometer as follows:

$$\cos(\beta) = A_{xy}/|A|$$

where $Z_2$ is the reading of the second accelerometer in the orthogonal direction, and $X_2$ is the reading of the second accelerometer in the horizontal direction. Although β is defined with respect to readings of the second accelerometer (520), it may be applied to the readings of the first accelerometer (510). In one embodiment, the angle β is calculated based upon reading of the accelerometer with a stronger signal. For example, the signals of each of the accelerometers may be read and compared, with the stronger signal selected for calculations.

As shown in FIG. 5, there is a first virtual triangle (560) formed by $R_2$, $A_1''$, $A_2$, and a second virtual triangle (570) formed by the vectors $A_1$, $A_2$, and $(A_2 - A_1)$. The first virtual triangle (560) is geometrically similar to the second virtual triangle (570). There are three angles formed in the second virtual triangle, including α (572), ε (574), and 65 (576). Based upon the derivations shown above, the principles of geometry of similar triangles are employed to show the relationship between vectors and angles, as follows:

$$r/\sin \alpha = |R_1|/\sin \epsilon = |R_2|/\sin \gamma$$

Based upon the geometric relationship of the angles and vectors, both vectors $|R_1|$ and $|R_2|$ can be defined based upon the distance r between the two accelerometers (510) and (520) and the angles of the similar triangles (560) and (570), as follows:

$$|R_1| = r \sin \epsilon/\sin \alpha$$

$$|R_2| = r \sin \gamma/\sin \alpha$$

Furthermore, based upon the principles of both geometry and linear algebra, the sins of the angles can be found using the cross product formulas of vectors of the accelerometer readings as follows:

$$\sin \alpha = |A_1 \times A_2|/(|A_1| |A_2|)$$

$$\sin \epsilon = |A_1 \times (A_1 - A_2)|/(|A_1| |A_1 - A_2|)$$

$$\sin \gamma = |A_2 \times (A_1 - A_2)|/(|A_2| |A_1 - A_2|)$$

As shown above, the vectors $R_1$ (512) and $R_2$ (522) are defined based upon the sins of the angles of the similar triangles (560) and (570). The vectors $R_1$ (512) and $R_2$ (522) may be solved for based upon the readings of the accelerometers by substituting in the definition for each sin angle from above as follows:

$$|R_1|=r\cos\beta(|A_2\times(A_1-A_2)|\,|A_1|/(|A_1-A_2|\,|A_1\times A_2|)$$

$$|R_2|=r\cos\beta(|A_1\times(A_1\times A_2)|\,|A_2|/(|A_1-A_2|\,|A_1\times A_2|)$$

Which can be further reduced to:

$$|R_1|=r\cos\beta|A_1|/|A_1-A_2|\text{ and}$$

$$|R_2|=r\cos\beta|A_2|/|A_1-A_2|$$

Once vectors $R_1$ and $R_2$ are known, angular rotation parameters of the motion can be found, as with the dual axis accelerometer arrangement, with the following calculations:

$$\cos\delta=|A_2.R_2|/(|A_2|\,|R_2|)$$

$$w=\text{square root of }((|A_2|/|R_2|)\cos\delta)$$

$$\Omega=(|A_2|/|R_2|)\sin\delta$$

Figure 6:
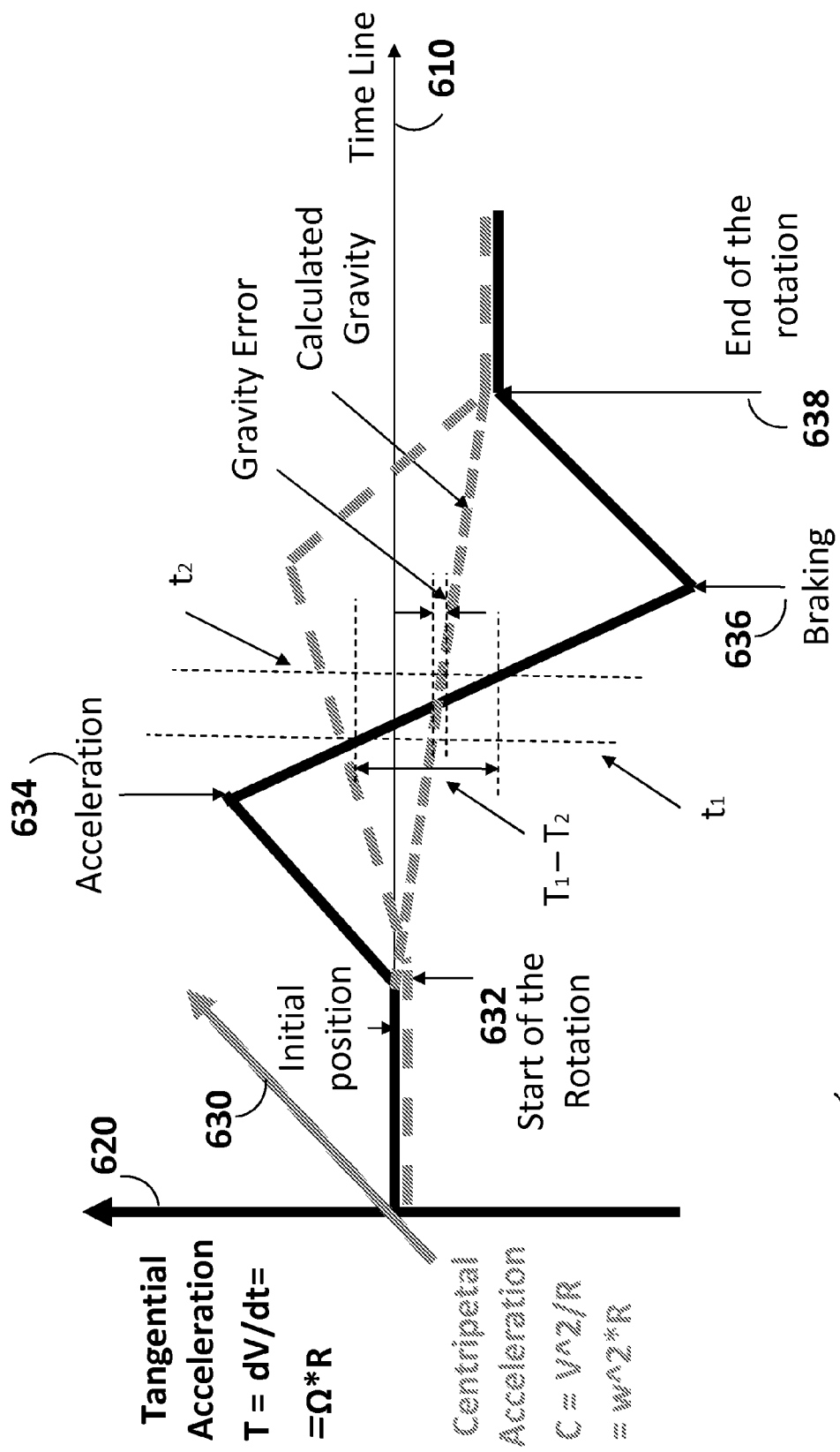
FIG. 6 is a diagram showing change in tangential and centripetal forces over time and the effect of error associated with the force of gravity.

FIG. 1 shown above demonstrates changes in centripetal and tangential accelerations over time, but does not show in detail the affect of gravity. In one embodiment, the sensitivity aces of the accelerometers are affected by gravity and/or uniform lateral accelerations. FIG. 6 is a block diagram (600) demonstrating change of position over time and the effect of error associated with the force of gravity. There are three axes shown herein, a horizontal axis (610), a vertical axis (620), and an orthogonal axis (630). The horizontal axis (610) represents the timeline. Similarly, the vertical axis (620) represents the tangential acceleration, and the orthogonal axis represents the centripetal acceleration. As shown on the horizontal axis (610), initially the body that houses the accelerometers is stationary and at rest (630). Over the course of time, there is a start of rotation of the body (632), a registered acceleration (634), a slowing down of the acceleration (636), and the end of the rotation (638). In order to compensate for the error associated with the force of gravity, a time different signal is obtained from the accelerometers. In other words, instead of measuring the signals from the accelerometers at a single point in time, each of the accelerometers are measured at two points in the timeline. For example, the time differential of the signals is reflects as follows:

$$A_N(X_{Nt1}-X_{Nt2},Y_{Nt1}-Y_{Nt2})$$

In one embodiment, the time interval of $t_1$-$t_2$ should be short to neglect the change of the object orientation. Furthermore, in one embodiment, the time interval is selected close to the middle of the rotation when the tangential component crosses the zero line and the centripetal component is at or near its maximum value.

The error associated with the force of gravity can be further reduced by adding a compensating value calculated as follows:

$$\text{Error compensation}=((G_{initial}-G_{ending})/(t_{start}-t_{end}))*(t_1-t_2)$$

where, $G_{initial}$ and $G_{ending}$ are gravity vectors measured at the beginning and ending of the rotation.

Obviously the latter calculation requires waiting until the end of rotation. While this may not represent any problems for such applications as dead reckoning in GPS system it introduces unwanted latency for applications with real-time or near real-time requirements. In this case the calculated error can be either neglected or replaced with empirically determined and tabulated data. Typically this does not represent a problem since real-time and near real-time applications require less accuracy. Please note the time differential signal can be obtained for such short periods at few milliseconds which is already sufficient to reduce the gravity induced error to negligible levels.

Figure 7:
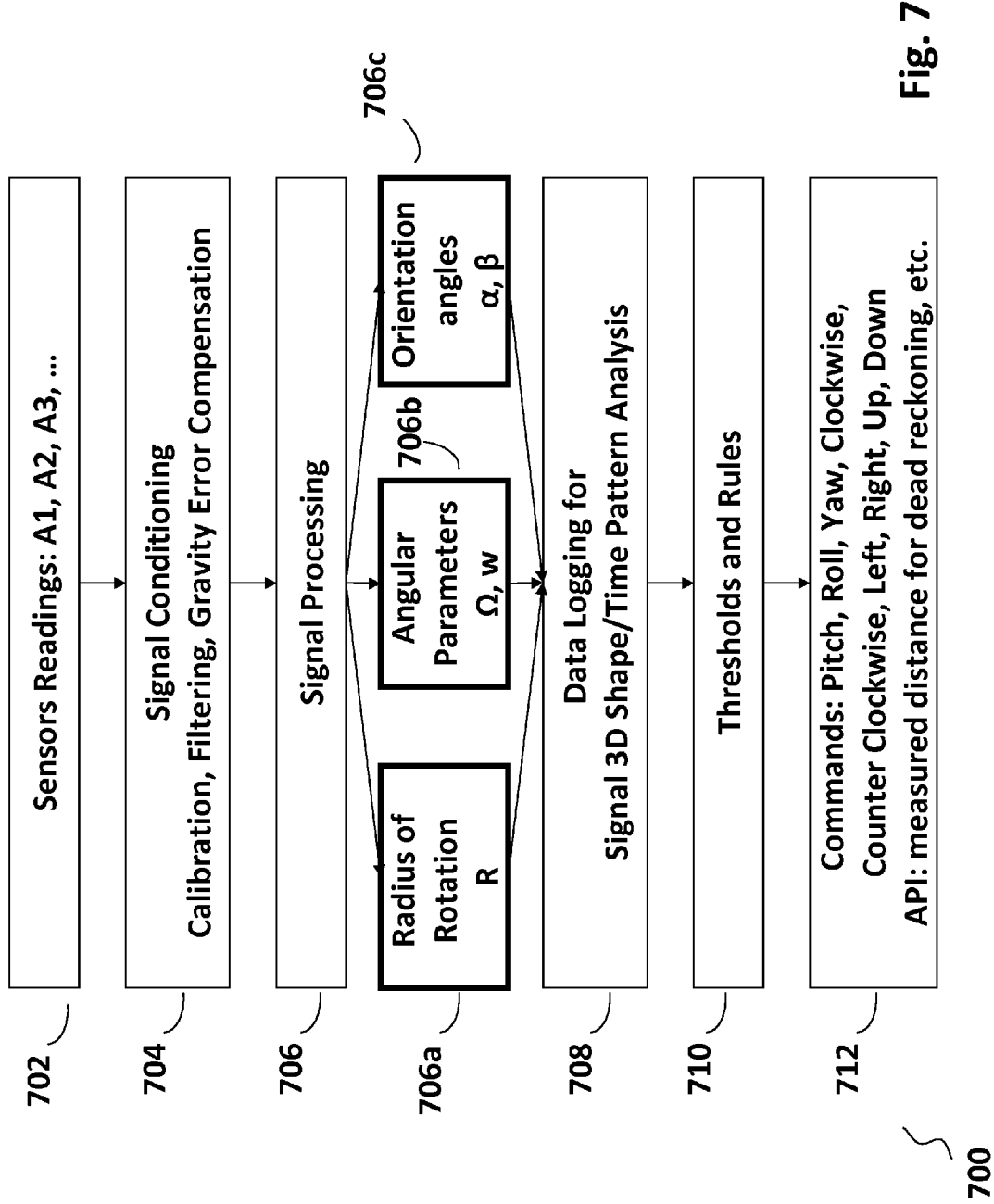
FIG. 7 is a flow chart demonstrating a generalized motion input algorithm.

Unlike traditional motion sensor applications, the proposed motion input algorithm is capable of making decisions based on three parameters which include the radius of rotation, the angular acceleration or calculated rotation rate, and offset angles showing the orientation of an accelerometer arrangement relative to the radius of rotation. FIG. 7 is a flow chart (700) demonstrating a process for sensing motion based upon the parameters and arrangement of accelerometers described above. The process shown herein is described for a handheld computing device with a visual display. In one embodiment, a cursor in communication with the visual display is moved across the display in response to sensed motion. However, the invention should not be limited to a cursor in communication with a visual display. For example, in one embodiment data shown in the visual display is changed is response to the sensed motion. In another embodiment the motion can be used to highlight or select an item on the display. Movement of the cursor or a change of the visual display or any other command which make activate or deactivate a pre-programmed feature is responsive to data from the accelerometers. Initially, when the handheld device is subject to motion, the sensor readings are acquired (702). It is known in the art that such sensor readings may have noise associated with the acquired data. As such, the signals of the sensors are conditioned (704) to accommodate the noise and dispersion of accelerometer parameters. Such conditioning may include filtering noise, calibration, and/or gravity error compensation. Following step (704), the received signals are processed (706). In one embodiment, a digital signal processor may be employed for the calculations at step (706). The three elements calculated at step (706) include the radius of rotation, R (706a), angular parameters, such as $\Omega$ and w (706b), and orientation angles, such as $\alpha$ and $\beta$ (706c). Following the calculations above, data logging for signal shape analysis is conducted (708) followed by applying rules and thresholds to the data (710). The application at step (710) provides the additional ability to filter signals based on the radius of rotation, rate of rotation, and/or offset angles as well as the signal shape in time. Following completion at step (710), data from the accelerometers is converted into command assigned to a specific motion signal (712). In one embodiment, the commands may be in the form of pitch, roll, and/or yaw signals that correspond to a clockwise, counterclockwise, left, right, up, and down movement of the cursor across the visual display, or as explained above a change in data displayed on the visual display or execution of a predefined function. Accordingly, data gathered by the accelerometers is employed to control communication with a visual display of a hand held computing device.

Signal processing formulas depend on type of motion sensors, geometric arrangement of sensors, and intrinsic characteristics of analyzed motion. Traditional solutions can filter motion interference only based on signal strengths or shape. The latter requires complex calculations in time. The proposed solution adds a capability to filter out effects of interfering forces based on the radius of rotation caused by these forces. The system can be set up to ignore forces which cause rotation over, below, or within certain radius of rotation. For example, signals with a radius less than R, such as that resulting from flexing the wrist, would be proceeded as motion input, while signals with the radius greater than R would be blocked. Equally to the radius of rotation, the system can be set to ignore or process signals based on the direction to the axis of rotation determined by offset angles $\alpha$ and $\beta$. This allows the system to operate inside of a moving vehicle without interference caused by external forces. Another benefit would be that the system cannot be confused with gravity and therefore can be held in any position relative to the center of Earth. Accordingly, a user is free to find and maintain the most comfortable posture and the best possible viewing angle.

Motion input in handheld devices neither requires exact knowledge of the radius of rotation or of the offset angle. For handheld devices, it is sufficient to verify that the radius of rotation and the offset radius are within a defined range. For these applications, it is enough to verify that the motion comes from user's hand and is not an interference created by the environment. It is enough to distinguish the rotation of a handheld over a vertical axis from a horizontal axis.

Figure 8:
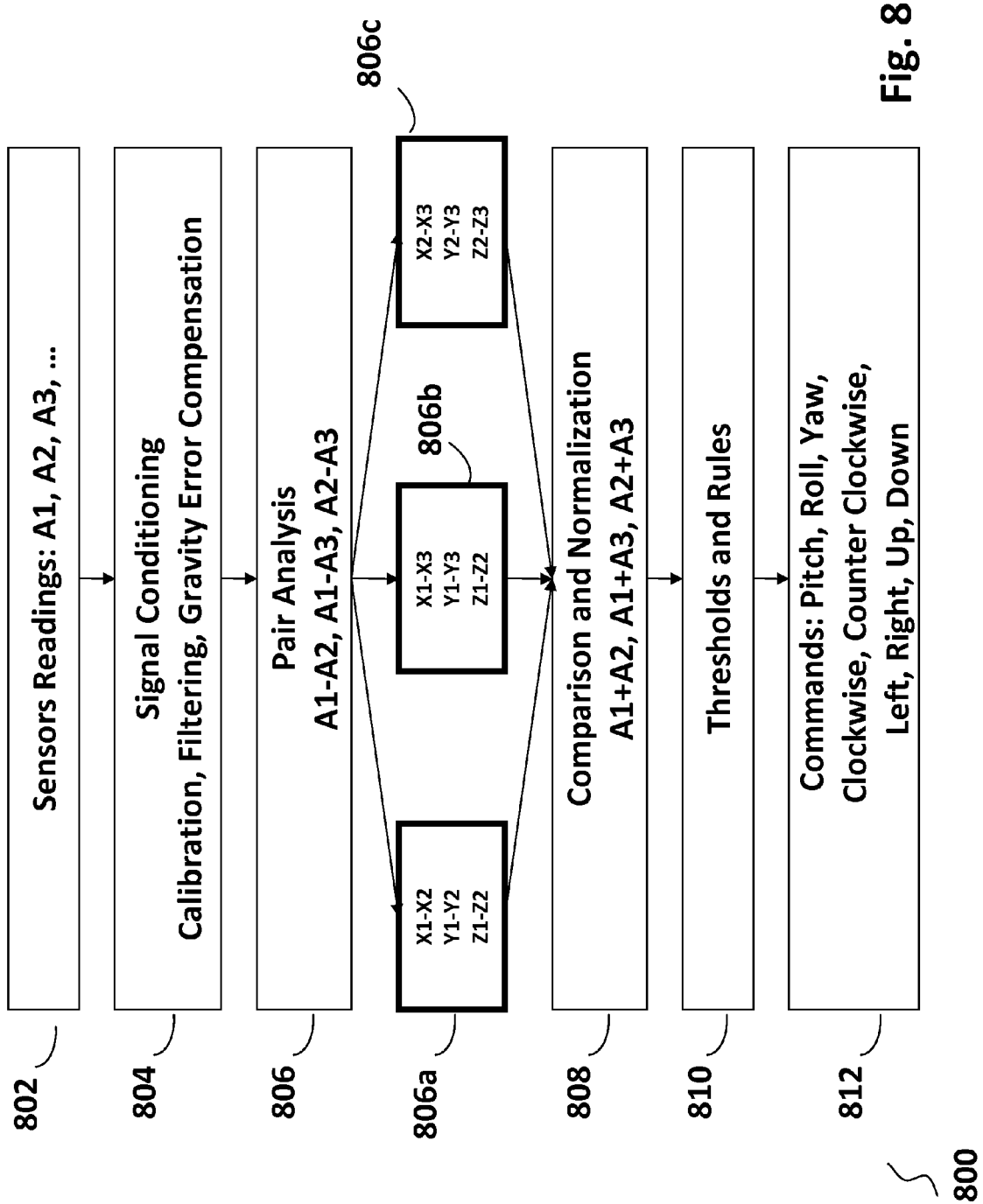
FIG. 8 is a flow chart demonstrating an algorithm for a Pair Comparison motion input.

FIG. 8 is a flow chart (800) demonstrating a Pair Comparison Motion Input algorithm to determine a prevailing axis of rotation by comparing strengths of differential motion signals from all pairs of accelerometers. The axis associated with the pair of accelerometers which produces the strongest signal is considered to be the direction chosen by the user. Initially, when the handheld device is subject to motion, the sensor readings are acquired (802). It is known in the art that such sensor readings may have noise associated with the acquired data. As such, the signals of the sensors are conditioned (804). The conditioning may include calibration, filtering noise, and gravity error compensation. Following step (804), the acceleration pair analysis is conducted (806) by finding the differential signals for acceleration components that in general form can be expressed as $A_1-A_2$, $A_2-A_3$, and $A_1-A_3$. For an arrangement of three tri-axial accelerometers the following pairs have to be analyzed: $[X_1-X_2, Y_1-Y_2, Z_1-Z_2]$ as reflected at (806a), $[X_1-X_3, Y_1-Y_3, Z_1-Z_3]$ as reflected at (806b), and $[X_2-X_3, Y_2-Y_3, Z_2-Z_3]$ as reflected at (806c), where numbers 1, 2, 3 correspond to a specific accelerometer in a three accelerometer arrangement and X, Y, Z correspond measurements of the individual accelerometers along the horizontal, vertical, and orthogonal axes, respectively. For example, $X_1$, $Y_1$, $Z_1$ are the readings of the first accelerometer taken along horizontal, vertical, and orthogonal axes, respectively, $X_2$, $Y_2$, $Z_2$ are readings of the second accelerometer taken along horizontal, vertical, and orthogonal axes, respectively, and $X_3$, $Y_3$, $Z_3$ are readings of the third accelerometer taken along horizontal, vertical, and orthogonal axes, respectively. Following the pair analysis at step (806), comparison and normalization of the accelerometer pairs is conducted (808). At this step the differential signal of (806) is normalized by being divided by the sum signal from the paired accelerometers such as $A_1+A_2$, $A_1+A_3$, $A_2+A_3$. Following the calculations above, rules and thresholds are applied to the data (810) and a command of pitch, roll, or yaw is applied to the device in which the accelerometers are mounted (812). For example, in the case of mounting the accelerometers in a handheld computing device with a visual display a change in data present on the visual display may occur. The commands applied to the device may be in the form of pitch, roll, and/or yaw signals that correspond to a clockwise, counterclockwise, left, right, up as well as lateral push and pull. The signal can control the movement of the cursor on the display or change or transform what is displayed on the screen. Accordingly, a reading of the accelerometers in combination with an associated analysis thereof corresponds to issuance of a command without requiring input from an external apparatus.

Figure 9:
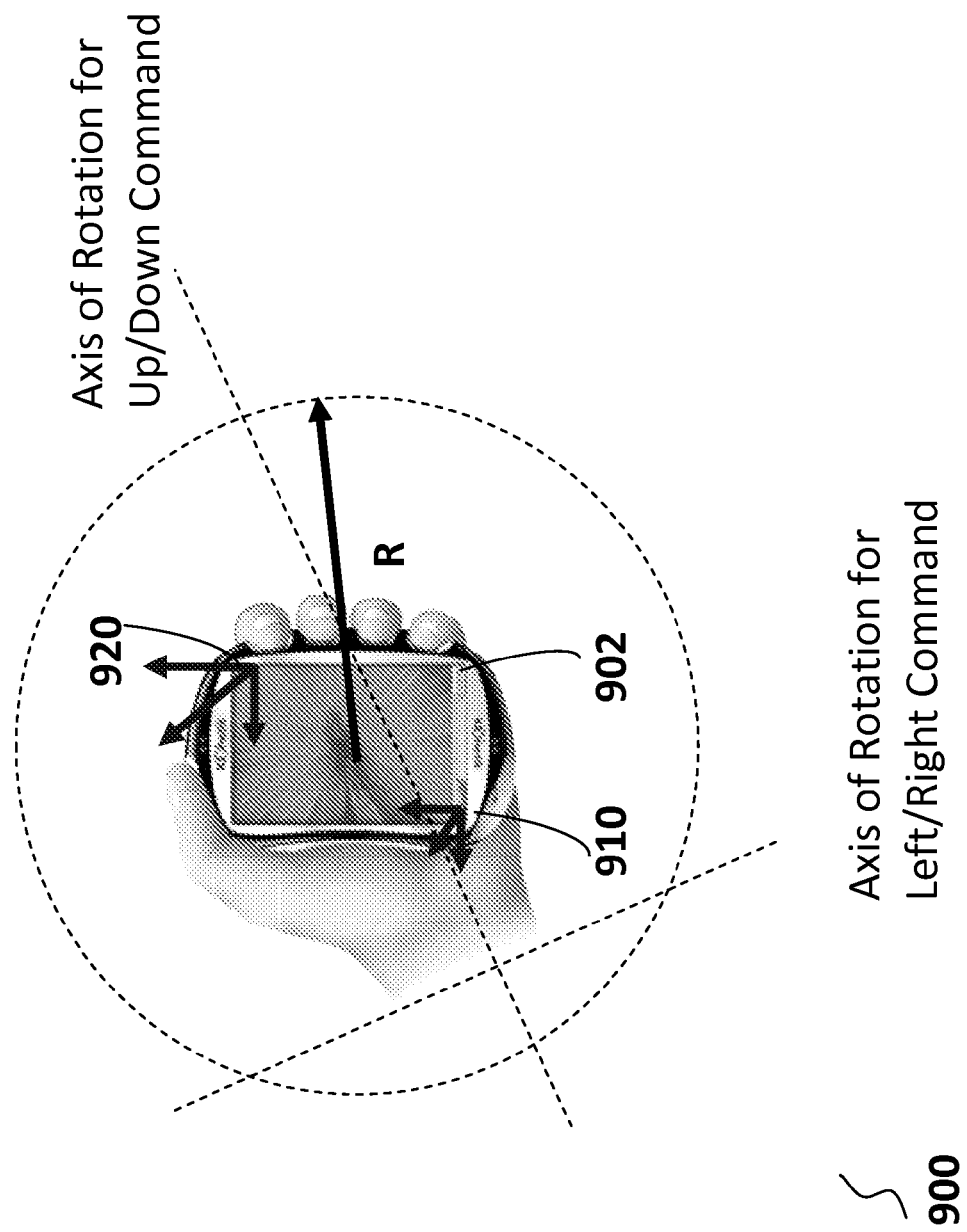
FIG. 9 is a diagram showing two tri-axial accelerometers positioned in a handheld computer.

FIG. 9 is a block diagram of a handheld computing device (900). At least two accelerometers (910) and (920) are mounted within the device in a planar arrangement. In one embodiment, the device has a visual display (902) that is virtually divided into a grid (not shown) with multiple boxes formed within the grid. Each box within the grid represents a position about which the cursor may be moved. In addition, one or more boxes in the grid may be represented by an icon that represents selection of a program. Each program may be selected by movement of the handheld device without employment of an external apparatus. More specifically, as the device is rotated, the sensor readings are gathered and the gathered readings are analyzed. In one embodiment, logic circuitry (not shown) functions to receive signals from each of the accelerometers (910) and (920), and communicates the received signals to a processor (not shown) mounted within the device (900). The processor computes motion variables as demonstrated in FIG. 7 or 8. Based upon thresholds and rules applied to the gathered readings, the processor communicates with the visual display to selectively move the cursor across the grid to a desired box for selection of an icon represented and displayed on the box of the grid. Accordingly, the accelerometers together with an associated processor communicate with and control movement of a cursor across a visual display.

Figure 10:
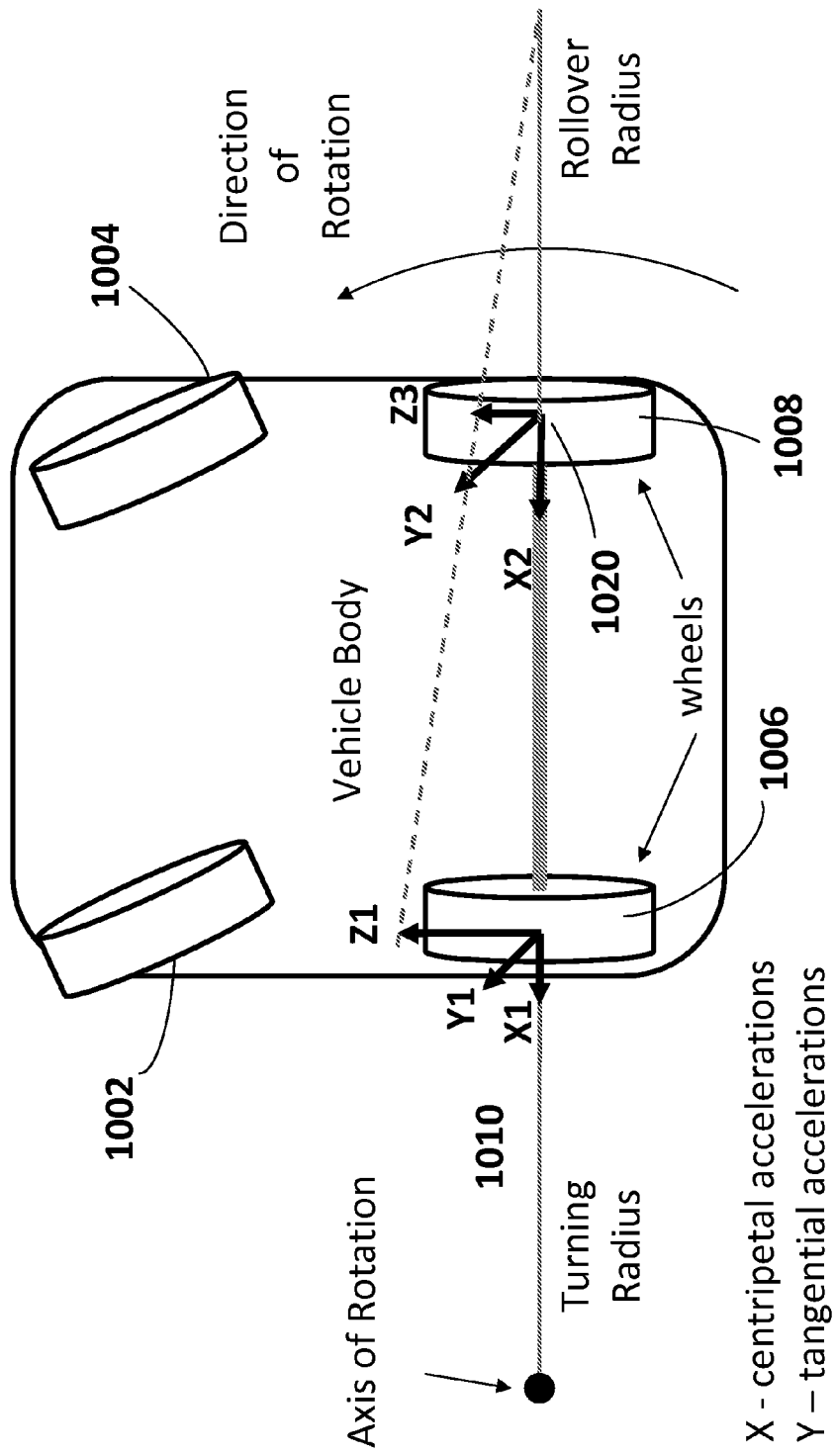
FIG. 10 is a diagram of a vehicle body showing an arrangement of accelerometers.

Although the prior description applies to handheld devices, the invention should not be limited to employment of the accelerometers and arrangement thereof in a portable handheld device. The arrangement of accelerometers functions as a virtual gyroscope, and may be employed in a variety of objects that may benefit for detection of motion therein. FIG. 10 is a block diagram (1000) of a vehicle body to which the accelerometer arrangement may be employed. As shown, the vehicle in this example is a land vehicle with four wheels (1002), (1004), (1006), and (1008). In this example, two accelerometers (1010) and (1020) are mounted within the vehicle body. Each of the accelerometers in the example shown herein senses motion over three axes, roll, pitch, and yaw. In one embodiment, the two accelerometers (1010) and (1020) may be dual axis accelerometers that only sense motion over the roll and pitch axes. Similarly, in one embodiment, a third accelerometer may be added to the arrangement shown in FIG. 10. The X axis senses centripetal accelerations. The Y axis senses tangential accelerations. The Z axis sense rollover accelerations. The positions of the accelerometers are shown parallel to the axle of one set of wheels, but are not limited to the arrangement shown herein. Motion sensed by the accelerometers is comparable to the method shown in FIGS. 7 and 8. However, in the case of a land vehicle a sensed motion that exceeds a threshold may communicate with an alarm or vehicle stability device for control of the vehicle. The land vehicle shown herein includes four wheels (1002), (1004), (1006), and (1008). However, in one embodiment, the vehicle may be an all terrain vehicle that is limited to three wheels. Similarly, the arrangement of accelerometers may be employed to other forms of land vehicles. In one embodiment, the arrangement of accelerometers may be employed with a non-land vehicle, such as a boat or an air vehicle. Therein, the arrangement of accelerometers may be employed to determine the curvature or trajectory of the vehicle in the respective fluid medium. Accordingly, the arrangement of accelerometers may be employed with a moving object to sense motion in up to six degrees of freedom.

Figure 11:
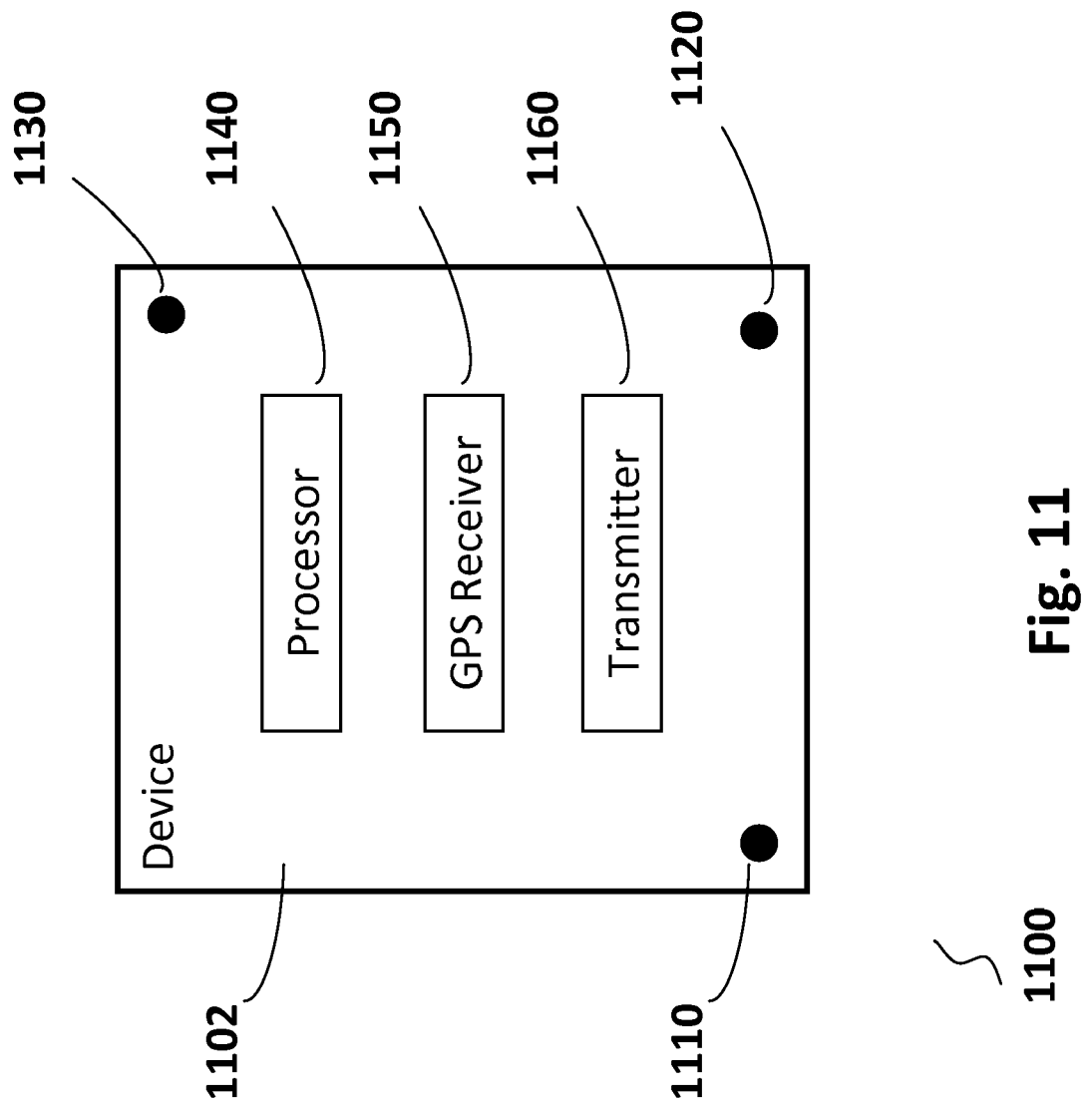
FIG. 11 is a diagram of a handheld device with an arrangement of accelerometers in communication with a global position system receiver.

The arrangement of accelerometers as applied to handheld devices and vehicles employs multiple accelerometers in a body or mounted on a substrate within the body. The body in which the accelerometers are mounted may include a global positioning system, herein after GPS, therein. A GPS system employs a receiver in communication with a satellite system to communicate location and position of the receiver. In general, GPS receives are composed of an antenna tuned to the frequencies transmitted by the satellites. GPS receivers are known in the art to be integrated in land vehicles, mobile telephones, watches, etc. It is also known in the art, that GPS receivers may also include a display for providing location and speed information to a user. By incorporating a GPS receiver into the body of a device with the accelerometer arrangement, the functionality of the accelerometer arrangement is enhanced. FIG. 11 is a diagram (1100) of a handheld device (1102) with an arrangement of accelerometers (1110), (1120), and (1130). As shown, the accelerometers are in communication with a processor (1140), a GPS receiver (1150) and a transmitter (1160). Based upon the motion sensed by the arrangement of accelerometers (1110), (1120), and (1130), the processor may control delivery of power to the GPS receiver (1150). For example, for a device (1102) that is stationary and then later subject to motion, the arrangement accelerometers may communicate with the processor (1140) to turn on the associate GPS receiver (1150). Conversely, if the device (1102) is in motion and then the motion stops, the accelerometers may communicate the change in motion to the processor (1140), which in turn removes power from the associated GPS receiver (1150). There are other avenues in which the GPS receiver (1140) enhances functionality with the arrangement of accelerometers, and the invention should not be limited to the specific motion example shown herein. The employment of the GPS receiver enables the device in which the receiver is located to be determined with accuracy. Accordingly, the augmentation of the accelerometer arrangement to include a GPS receiver expands the functionality of the device with respect to location thereof.

In one embodiment, the accelerometer and GPS receiver arrangement shown in FIG. 11 may be integrated into a vehicle, wherein the arrangement of accelerometers is in communication with a GPS receiver. The motion of the vehicle as sensed by the accelerometers may be augmented to communicate with the GPS receiver (1150) in view of a threshold and rule set in FIG. 8. For example, the vehicle may include an alarm component (not shown). If the vehicle is set into motion without a key in the ignition, the alarm component may communicate with the GPS receiver to include GPS data. For example, if the car is in the process of being towed or stolen, the alarm would transmit the location of the vehicle as provided by the GPS receiver. As described above, the arrangement of accelerometers sense motion. It is the employment of rules and thresholds in combination with the alarm and/or GPS receiver that enhance functionality of the device by transmitting location thereof. Accordingly, the GPS receiver communicates a location of the device when subject to motion that meets or exceeds rules and thresholds applied thereto. A very important application of accelerometers in GPS systems is provide data for dead reckoning when a GPS signal is lost. In this embodiment the invention can reconstruct the trajectory of the movement by calculating a known radius of rotation and elapsed time.

Step motion is defined as a code to translate user intentions into a precise command such as movement of a pointer over the grid cells and to allow readjustment of the system between steps. Sliding zero code described in cited above prior art (Shkolnikov '028 and '533) serves to check orientation of the device relative to the vector of gravity and allow the user to change his or her position while operating the device. The simple step motion in the proposed solution serves the same purpose, but operates without sliding zero code. It works on top of the motion input processing such as depicted on FIGS. 7 and 8. The simple step motion works with the arrangements of multiple sensors as described in present invention as well with systems with a single accelerometer. It simplifies calculations allowing forces caused by the returning motion to be ignored. The simple step motion code allows the user to maintain the best possible viewing angle of the display. After any motion input command, the user can either bring the device back into the previous position (as prior art requires) or change the orientation any way the user wants. It also allows the user to change his or her position. The Simple Step Motion algorithm has an additional feature based on the introduction of an "insensitivity" timeout, also known as a sleep period that works with any configuration of motion sensors, even with a single sensor, and with any implementation of an underlying motion input algorithm. The Simple Step Motion algorithm makes unnecessary the sliding zero component of the previous algorithm implementation, disclosed in U.S. Pat. No. 7,002,553 to Shkolnikov. More specifically, during the period of "insensitivity" the system automatically balances itself to compensate for the changes in orientation towards gravity and other external forces. During the period of "Sleep" the user can bring the handheld device back to restore the viewing angle or change the position to stay comfortable.

Figure 12:
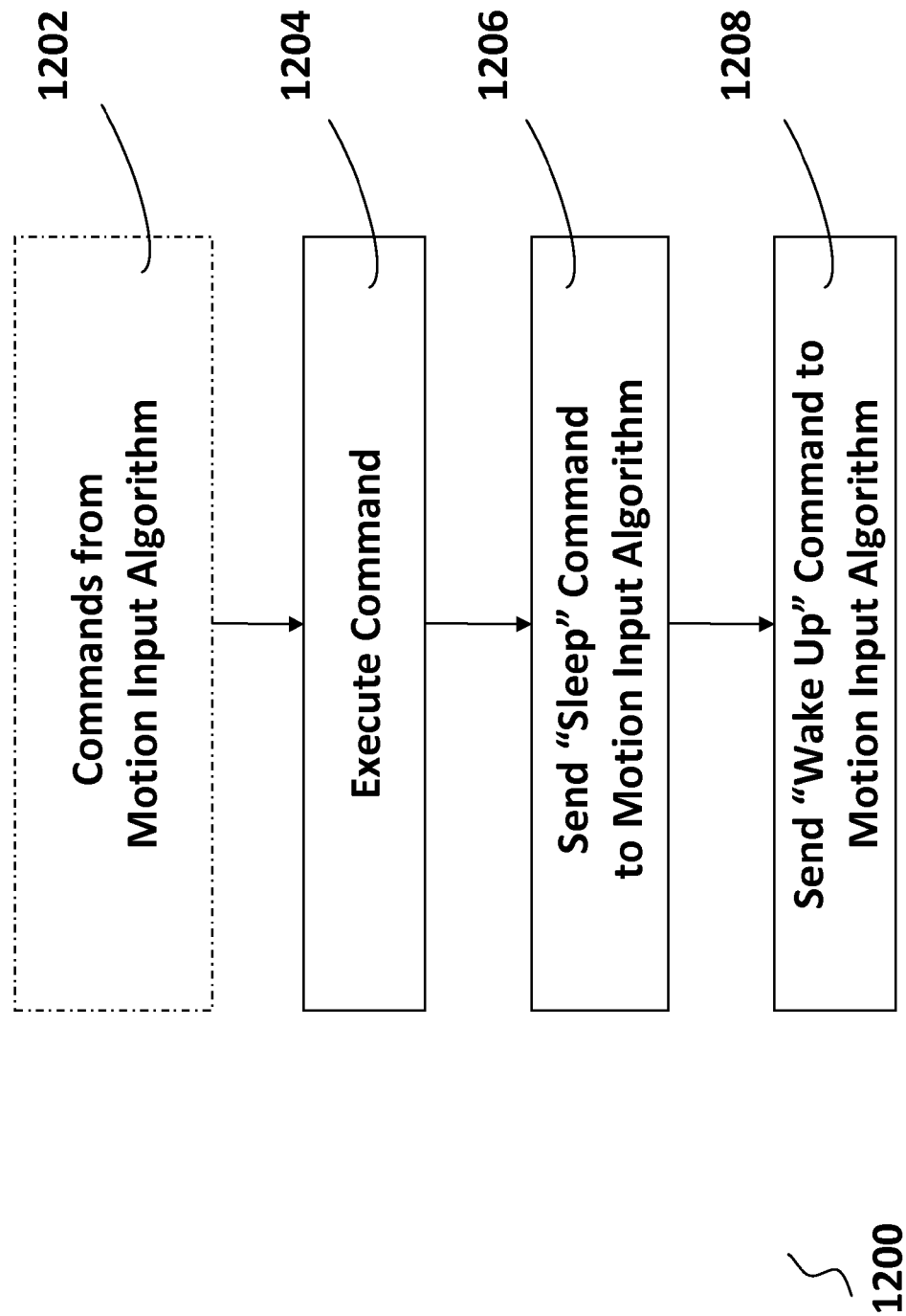
FIG. 12 is a flow chart demonstrating a Simple Step Motion algorithm.

FIG. 12 is a flowchart (1200) illustrating the simple step motion algorithm implemented on top of the motion input algorithm of FIGS. 7 and 8. A command from motion input algorithm is received (1202) and executed (1204). Processing of the command is shown and described in detail in reference to FIGS. 7 and 8. Following execution of the command at step (1204), a sleep command is sent to a motion input algorithm (1206). The sleep command blocks any new commands from the motion input algorithm. However, in one embodiment, the calculations of motion parameters may continue in the background. After completion of step (1206) the motion input algorithm receives a wake up command (1208) and is accessible for the next motion input. In the example shown in FIG. 9, a cursor is moved across a virtual grid of a visual display of a handheld computing device. Based upon movement of the device, the cursor is moved to a select box within the virtual grid. The step motion algorithm enables the movement of the cursor to take place and for the next movement to access the cursor from the current position thereof on the grid without requiring the cursor to return to its initial placement within the grid. After the "Sleep" time elapses, the simple step motion algorithm sends a "Wake up" command to the motion input algorithm (1208) to resume sending motion input commands with the current placement serving as a reference point of origin. Accordingly, all movements sensed by the accelerometers will be based upon the most recent reference point of origin as determined from the "Wake up" command.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For purposes of this description, a computer-usable or computer readable medium can be any apparatus that can, store, the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, or semiconductor system (or apparatus or device). Examples of a computer-readable medium include but are not limited to a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over Prior Art

In contrast to handheld devices described in the prior art, the handheld device of the present invention employs different arrangements of multiple accelerometers that support calculation of motion variables as a real-time or near real-time function of accelerometer readings and parameters defining geometry of the arrangement. The device is also insensitive towards the interference of gravitational force. Accordingly, there is no need to track the angular position of the device to calculate motion variables in real-time. The added capability to filter out effects of interfering forces based on the radius of rotation they are causing is also one of the advantages of the present invention. The system can be set up to ignore forces which cause rotation with the radius over, below, or within a certain range as well as the direction to the point of rotation. In addition, the introduction of an insensitivity timeout in the step motion algorithm makes the handheld device of the present invention not sensitive to a change in its own position and the user's position. This allows the user to maintain the best viewing angle of the display and a comfortable posture.

The arrangement of at least two dual or triple axis accelerometers functions as a combined gyroscope and regular motion sensor. More specifically, the arrangement of accelerometers as described herein enables determination of an angular rate of rotation, translational accelerations, and a radius of rotation of a device in which the accelerometers are mounted. In other words, the arrangement of the accelerometers senses roll, pitch, and yaw rotations like a gyroscope, and lateral translations like an accelerometer. The arrangement senses rotations and translations with up to six degrees of freedom. Furthermore, the ability to calculate the radius of rotation of the object, allows motions signals to be filtered by distance and direction to the point of rotations, as well as amplitude and pattern in time. In one embodiment, the filtering of motion signals enables a handheld device with the accelerometer arrangement to be controlled within a moving vehicle. Motion signals from the human wrist can be separated from interfering signals caused by steering, acceleration, bumps, and other forms of turbulence. Accordingly, the arrangement of accelerometers as described in detail above can be employed in any device where gyroscopes and accelerometers are currently present.

Alternative Embodiment

It will be appreciated that, although specific embodiments of the invention have been described herein for purposes of illustration, various modifications may be made without departing from the spirit and scope of the invention. In particular, it has been described in detail how the arrangement of two or more dual or triple axis accelerometers may be embedded within a handheld computing device. The dual accelerometer arrangement has limitations associated with determine the radius of rotation when the line connecting the accelerometers is parallel to the axis of rotation. Therefore, in one embodiment, this limitation is overcome by adding one or more accelerometers to the dual accelerometer arrangement and arranging the accelerometers in a non-linear format. For example, three accelerometers may be arranged in a triangular format, so that at least one of the accelerometers is positioned non-parallel to the axis of rotation. In one embodiment, the accelerometers with the geometrical arrangement described above may be embedded within a silicon substrate mounted within an integrated circuit. This enables the accelerometers to be a part of the electronics hardware of the device, and separate from the chassis, i.e. body. It shall be also noted that the accelerometers do not have to be neither identical nor similarly oriented as long as their output can be calibrated and/or mathematically transformed to look as if they are identical.

In one embodiment, the arrangement of accelerometers may be expanded and applied to different categories of devices. For example, the arrangement may be employed with a camera, including a still camera and a video camera, binoculars, telescopes, microscopes, etc. The arrangement in each of there devices may be employed to stabilize images by providing corrective signals to the lens, image receivers, and/or image stabilization software. As shown in FIGS. 8 and 9, thresholds and rules are applied to the analyzed signal readings of the accelerometers. The rules and thresholds may be programmed for a specific device application, such as image stabilization software. Accordingly, the scope of protection of this invention is limited only by the following claims and their equivalents.

I claim:
1. An apparatus comprising:
a body having at least two accelerometers mounted in the body, the accelerometers are separated in space and sense movement on at least one sensitivity axis;
a processor in communication with the accelerometers to receive sensed motion data from said accelerometers and to compute motion of said body from said motion data; and
said processor to execute instructions to compute a radius of rotation and direction to an axis of rotation for each of the accelerometers, said radius of rotation and direction to an axis of rotation defining the axis of rotation of said body, said instructions to apply geometrical principals to real-time accelerometer readings and fixed orientation and position of the accelerometers in reference to the body.

2. The apparatus of claim 1, wherein said instructions is limited to incremental data in excess of a threshold.

3. The apparatus of claim 1, wherein angular acceleration and angular velocity are derived from the accelerometer readings and computed radii of rotations.

4. The apparatus of claim 1, wherein said accelerometers are substantially identical with aligned sensitivity axes.

5. The apparatus of claim 1, wherein each of said accelerometers are dual axis accelerometers that sense motion on two orthogonal axes.

6. The apparatus of claim 1, further comprising three accelerometers mounted in the body in a triangular arrangement.

7. The apparatus of claim 1, wherein each of said accelerometers are triple axis accelerometers and sense motion on three orthogonal axes.

8. The apparatus of claim 1, further comprising a substrate mounted within said body, and said accelerometers mounted on said substrate with aligned sensitivity axes.

9. The apparatus of claim 8, wherein said substrate is a microchip.

10. The apparatus of claim 1, wherein said body is a handheld device in communication with a visual display, wherein an image shown in the visual display is changed in response to said sensed motion in excess of a threshold.

11. The apparatus of claim 1, further comprising said processor to compute a radius of rotation of said body in real-time.

12. The apparatus of claim 11, further comprising a filter system in communication with said processor to parse signals based on the computed radius of rotation, including processing a signal with a radius of rotation less than a predetermined value as motion input, and to block a signal with a radius of rotation greater than a predetermined value.

13. The apparatus of claim 11, further comprising a filter system in communication with said processor to parse signals based on the direction to the axis of rotation, including to process a motion input signal associated with a certain direction to the axis of rotation and to block a signal associated with another direction to the axis of rotation.

14. The apparatus of claim 11, further comprising a filter system in communication with said processor to parse signals based on angular acceleration and angular velocity, including to process a signal with an angular acceleration and angular velocity of more than a predetermined value as motion input and to block a signal with an angular acceleration and angular velocity less than a predetermined value.

15. The apparatus of claim 1, further comprising a global positioning system receiver in communication with said processor.

16. The apparatus of claim 15, further comprising said global positioning system receiver to transmit location data in response to said sensed motion in excess of a threshold.

17. The apparatus of claim 1, further comprising the processor to compute a distance and a direction to an axis of rotation of said body using triangulation.

18. The apparatus of claim 1, further comprising the processor to reduce error induced by gravity through differential reading in near real-time.

19. The apparatus of claim 18, further comprising a correction of gravity induced error calculation based on a reading of said accelerometers before and after rotation of said body.

20. The apparatus of claim 18, further comprising a correction of gravity induced error by adding or subtracting a stored empirical gravity compensation value.

21. The apparatus of claim 1, wherein the initial direction from each of said at least two accelerometers to said axis of rotation is not known.

22. An article comprising:
a body having at least one mounted accelerometer, configured to sense movement on at least one sensitivity axis;
a computer readable carrier including a motion input algorithm configured to translate the sensed movement received from the at least one accelerometer into a command, and a step motion algorithm to process the command, the step motion algorithm including instructions comprising:
instructions to execute a command from the motion input algorithm,
instructions to send a sleep command to the motion input algorithm after the command is executed; and
instructions to re-activate the motion sensing algorithm from the sleep command after elapse of a defined period of time.

23. The article of claim 22, wherein the sleep communication instructions temporarily block execution of a new command from the motion sensing algorithm.

24. The article of claim 22, wherein the sleep command provides readjustment of the motion input algorithm between successive movements of the body.

25. The article of claim 22, wherein the re-activate instructions send an activate command to the motion input algorithm to resume sending motion input commands with a current placement of the body as a reference point of origin.

26. The article of claim 22, further comprising instructions to parse a signal with a radius of rotation less than a predetermined minimum value as motion input, and to block a signal with a radius of rotation greater than a pre-determined value maximum value.

27. A method to sense movement of a body, comprising
mounting at least two accelerometers in a body, said accelerometers configured to sense movement on at least one sensitivity axis;
a processor in communication with the accelerometers for receiving sensed motion data from accelerometer data;
said processor computing motion of said body from said motion data; and
said processor executing instructions for computing a radius of rotation and direction to an axis of rotation for each of the accelerometers, said radius of rotation and direction to an axis of rotation defining the axis of rotation of said body, and applying geometrical principals to real-time accelerometer readings and fixed orientation and position of the accelerometers.

* * * * *